United States Patent
Larson et al.

(10) Patent No.: US 9,135,532 B2
(45) Date of Patent: Sep. 15, 2015

(54) PROCESSING IMAGE DATA STRIPS

(75) Inventors: Bradley R Larson, Meridian, ID (US); John Harris, Boise, ID (US); Mary T Prenn, Star, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/611,134

(22) Filed: Sep. 12, 2012

(65) Prior Publication Data

US 2013/0088731 A1  Apr. 11, 2013

Related U.S. Application Data

(60) Provisional application No. 61/544,406, filed on Oct. 7, 2011.

(51) Int. Cl.
*G06F 15/00* (2006.01)
*G06K 15/12* (2006.01)
*H04N 1/50* (2006.01)
*H04N 1/64* (2006.01)
*G06K 15/02* (2006.01)

(52) U.S. Cl.
CPC ............ *G06K 15/12* (2013.01); *G06K 15/1857* (2013.01); *G06K 15/1865* (2013.01); *G06K 15/1894* (2013.01); *H04N 1/506* (2013.01); *H04N 1/648* (2013.01)

(58) Field of Classification Search
USPC ............... 358/1.9, 1.16, 1.17; 347/5, 14, 116; 709/201, 232, 242; 710/20, 21
See application file for complete search history.

(56) References Cited

U.S. PATENT DOCUMENTS

| | | | |
|---|---|---|---|
| 5,463,720 A | 10/1995 | Granger | |
| 5,949,964 A | 9/1999 | Clouthier et al. | |
| 6,049,390 A | 4/2000 | Notredame et al. | |
| 7,407,261 B2 | 8/2008 | Silverbrook | |
| 7,573,603 B2 | 8/2009 | Pattusamy et al. | |
| 7,826,677 B2 | 11/2010 | Tsai | |
| 7,839,424 B1 | 11/2010 | Clark et al. | |
| 8,022,957 B2 | 9/2011 | Ishikawa | |
| 2003/0142154 A1 | 7/2003 | Furimori | |
| 2005/0180648 A1 | 8/2005 | Curry et al. | |
| 2006/0067592 A1 | 3/2006 | Walmsley et al. | |
| 2006/0092205 A1* | 5/2006 | Jackson Pulver et al. | 347/13 |
| 2006/0103689 A1* | 5/2006 | Vinas et al. | 347/15 |
| 2006/0120787 A1* | 6/2006 | Abello | 400/76 |
| 2006/0268316 A1* | 11/2006 | Condon et al. | 358/1.15 |
| 2007/0216920 A1 | 9/2007 | Watanabe | |
| 2007/0247490 A1* | 10/2007 | Sheahan et al. | 347/42 |
| 2011/0246670 A1 | 10/2011 | Ishikawa | |

FOREIGN PATENT DOCUMENTS

EP  0730249  9/1996

OTHER PUBLICATIONS

International Searching Authority, The International Search Report. Application No. PCT/US2011/041425 Filing date Jun. 22, 2011.

* cited by examiner

*Primary Examiner* — Jamares Q Washington
(74) *Attorney, Agent, or Firm* — Law Office of Robert C. Sismilich

(57) ABSTRACT

An apparatus and methods for processing image data in multi-row strips to generate print data for colorizers of a printer.

24 Claims, 14 Drawing Sheets

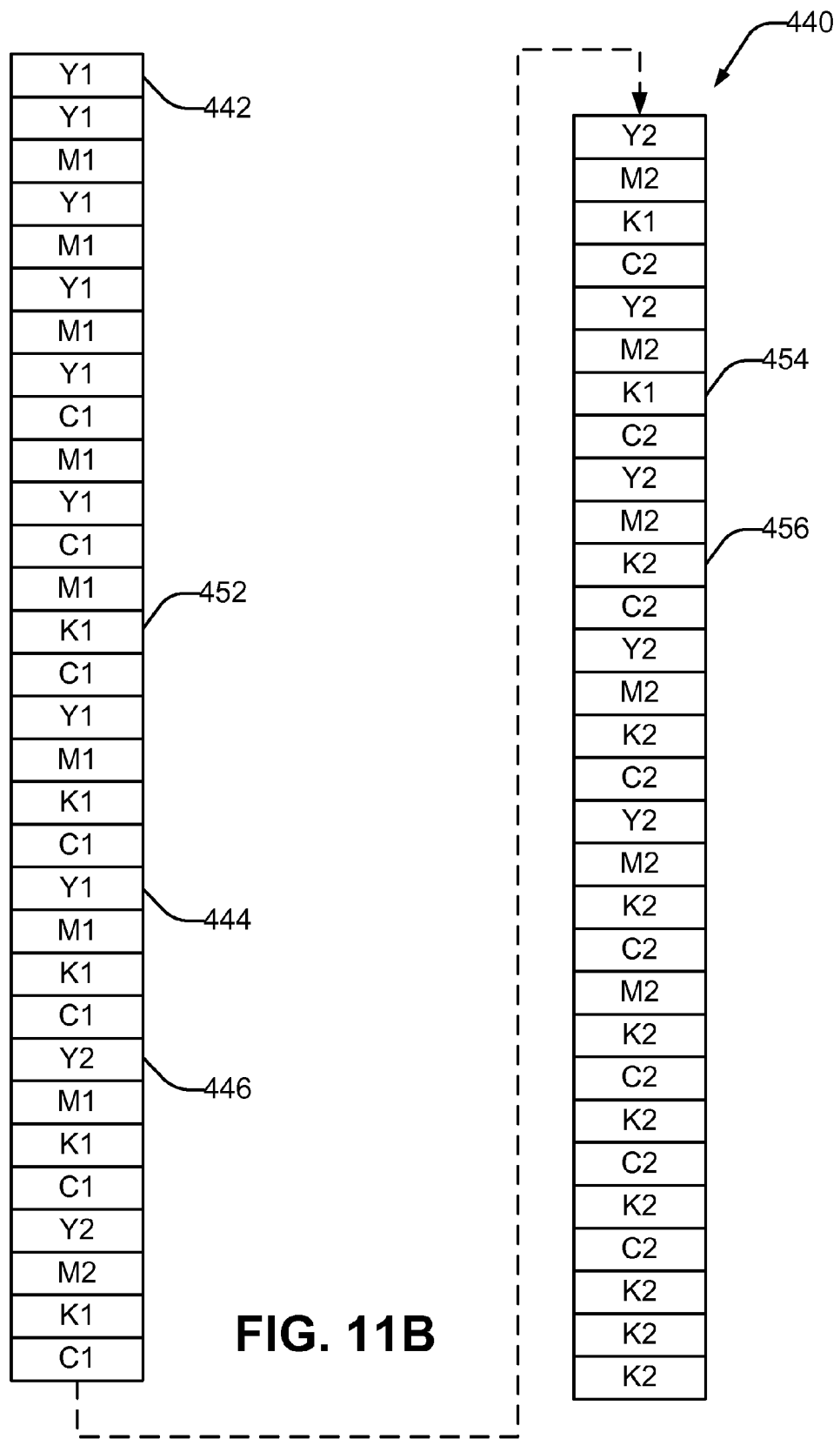

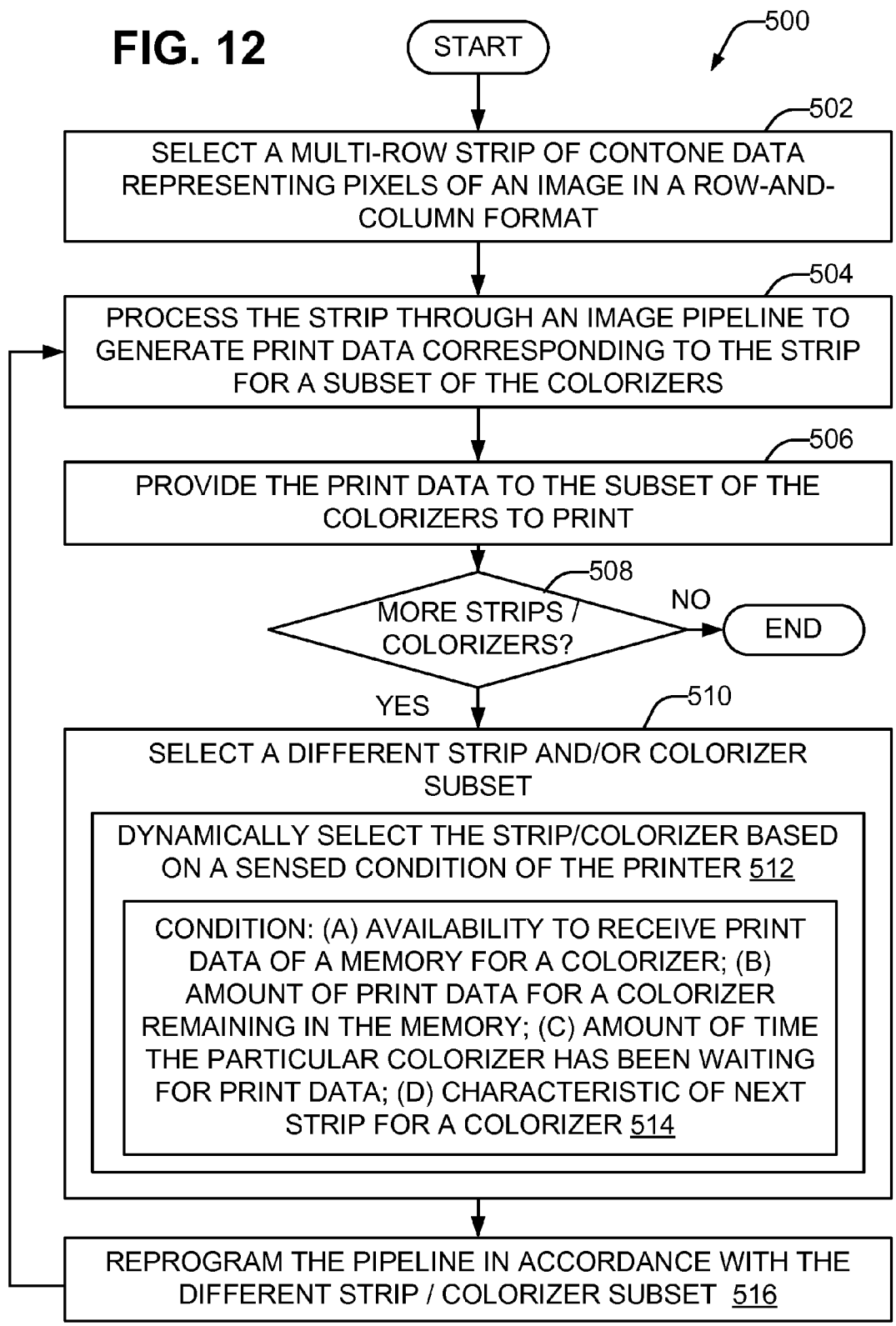

PROCESSING IMAGE DATA STRIPS

CROSS-REFERENCE TO RELATED APPLICATION

This application is based on and claims the benefit of U.S. Provisional Application No. 61/544,406, filed Oct. 7, 2011, and titled "PROCESSING IMAGE DATA STRIPS", which is hereby incorporated by reference herein in its entirety.

BACKGROUND

Printers, both black-and-white and color, are widely used in businesses and in homes. Such printers include laser printers, inkjet printers, and other printing technologies. In addition to stand-alone printers, printers are also widely incorporated into other products that utilize a printing subsystem, such as copiers, facsimile machines, and multifunction devices (e.g. a combination of at least two of a printer, scanner, copier, and fax), to name a few. In general, printers receive image data, and convert the image data into print data that is used to print the image on a print medium.

BRIEF DESCRIPTION OF THE DRAWINGS

FIG. 11B is an enlarged schematic representation in accordance with an embodiment of the present disclosure of the example sequence of strips processed by the image pipe of FIG. 11A.

FIG. 12 is a flowchart in accordance with an embodiment of the present disclosure of a method of printing, with a printer having plural inline colorizers, a page of contone data representing pixels of an image in a row-and-column format.

DETAILED DESCRIPTION

Figure 1:
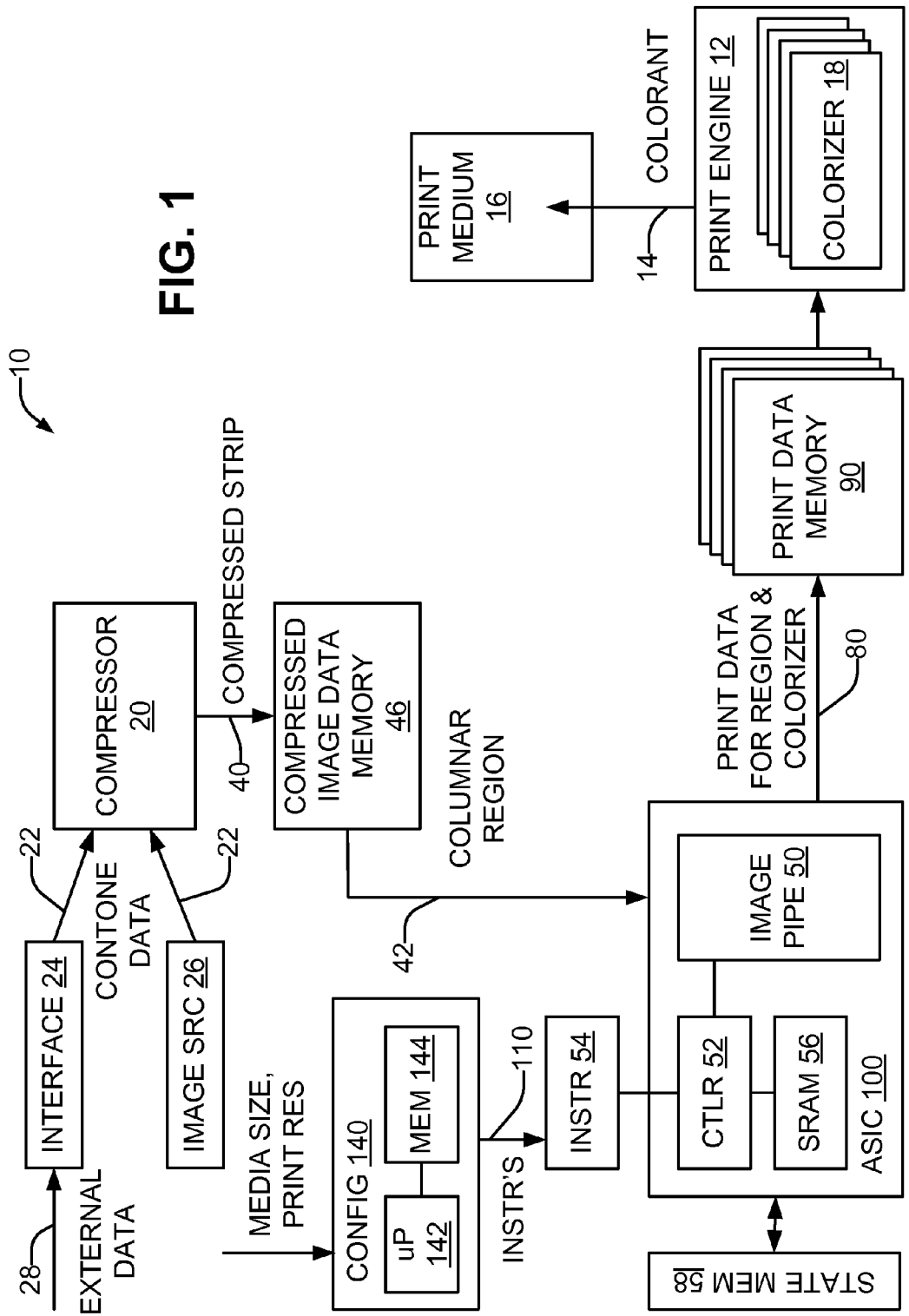
FIG. 1 is a block diagram representation of a printer according to an embodiment of the present disclosure.

As noted in the Background section, printers are widely used in a variety of products and applications. Many users desire that these products, for a given level of performance and quality, have a low cost. Many users also desire to print on different size print media at different times. For example, at one time the user may wish to print on smaller A4 size media, while at other times print on larger A3 size media. Similarly, users may wish to print at different print resolutions at different times; for example, at a resolution of 300 dots-per-inch (dpi) at one time, and at 1200 dpi at another time.

The print media may be any type of suitable sheet or roll material, such as paper, card stock, cloth or other fabric, transparencies, mylar, and the like, but for convenience the illustrated embodiments are described using paper as the print medium.

A printer is designed to meet the most demanding requirements that it supports. In the example above, the printer would be designed to print on A3 media at 1200 dpi, but could also be used with A4 media and at 300 dpi. More stringent requirements increase the cost of a variety of components of the printer. For example, many printers process the data for an image to be printed in a series of image-wide strips. Processing and storing data for an A3-wide, 1200 dpi image strip uses components having more logic and memory than would an A4-wide, 300 dpi image. One such component may be an application-specific integrated circuit (ASIC) which implements an image pipeline for converting the image data into print data for a print engine. In one situation, these components are designed for the most stringent requirements, and these costs are passed on to all purchasers, even those with less stringent printing requirements. Alternatively, different components are designed for each set of printing requirements, but this adds complexity and cost to many aspects of a manufacturer's operations. Furthermore, if a new requirement comes along—for example, printing an A3-wide strip at 2400 dpi—the existing components would likely be unable to accommodate it.

Referring now to the drawings, there is illustrated an example of a printer and printing methods which process an image data strip having one or more columnar regions in serial fashion. The printer includes an image pipeline that is dynamically reprogrammed to process each strip, and each region of the strip. The number of columnar regions to be processed for a strip may be configured based on the media size, the print resolution, and a predetermined width of the columnar regions. By varying the number of columnar regions to be processed for a strip, different combinations of media size and print resolution can be accommodated by the ASIC. Likewise, by varying the amount of parallel processing performed, different performance levels can be achieved by the ASIC. This width and the amount of parallel processing may be judiciously selected to advantageously lower the cost of the printer by reducing the amount of memory and logic internal and external to the ASIC, with sufficient image processing throughput for the printing applications. The same ASIC and internal logic designs can be used in a variety of printers having a range of different performance levels, media size, and print resolution requirements. In addition, by increasing the number of columnar regions in a strip, the ASIC can be used to print on newer and larger media sizes, and at newer and increased printing resolutions.

As best understood with reference to FIG. 1, one example of a printer 10 has a print engine 12 for depositing at least one colorant 14 on a print medium 16. As defined herein and in the appended claims, a "colorant" shall be broadly understood to mean a substance of a particular color deposited onto a print medium to form at least a portion of a printed image. The print engine 12 has at least one colorizer 18. As defined herein and in the appended claims, a "colorizer" shall be broadly understood to mean a print engine subsystem that directly or indirectly deposits a particular colorant onto a print medium. For example, engine 12 may have four colorizers 18, each colorizer 18 configured to deposit a different one of cyan (C), magenta (M), yellow (Y), and black (K) colorant. Such colorants are one example of a colorant set that enables a color image to be printed on the print medium 16. In other examples, instead of a single print engine 12 with multiple colorizers 18, there may be a multiple print engines 12 each with one or more colorizers 18.

The printer 10 includes a compressor 20. The compressor 20 is configured to convert continuous-tone (contone) image data 22 in a row-and-column format into compressed multi-row strips 40 of pixels. As defined herein and in the appended claims, "contone image data" shall be broadly understood to mean a two-dimensional arrangement of pixels that collectively represent an image, wherein the pixels have a sufficient range of values such that the image presents a substantially continuous tone to a viewer. The contone image data may be grayscale or color. The contone image data is typically represented in a color space. One example color space is RGB, in which each pixel has a red value, a green value, and a blue value that collectively define the color of the pixel in a three-dimensional color space. An RGB color space is considered to be "device-independent" in that the individual R, G, and B values do not correspond to any particular image rendering device. For example, these values do not directly correspond to the C, M, Y, and K values for the colorizers 18 of the printer 10.

The contone image data 22 may be external data 28 received from a source external to the printer 10, such as a computer for example, via interface 24. In some examples, high level image data, such as data in a page description language (PDL), may be sent to the printer 10, and the printer 10 processes the PDL data to generate the contone image data 22. The contone image data 22 may alternatively or in addition be received from an image source 26 internal to the printer 10 via interface 24. The image source, for example, may be an optical scanner that is included in a copier or a multifunction printing device, for example. Different formats of contone data 22 may be input to the compressor 20, and the compressor 20 may be configured to compress a variety of different contone data formats.

Figure 2:
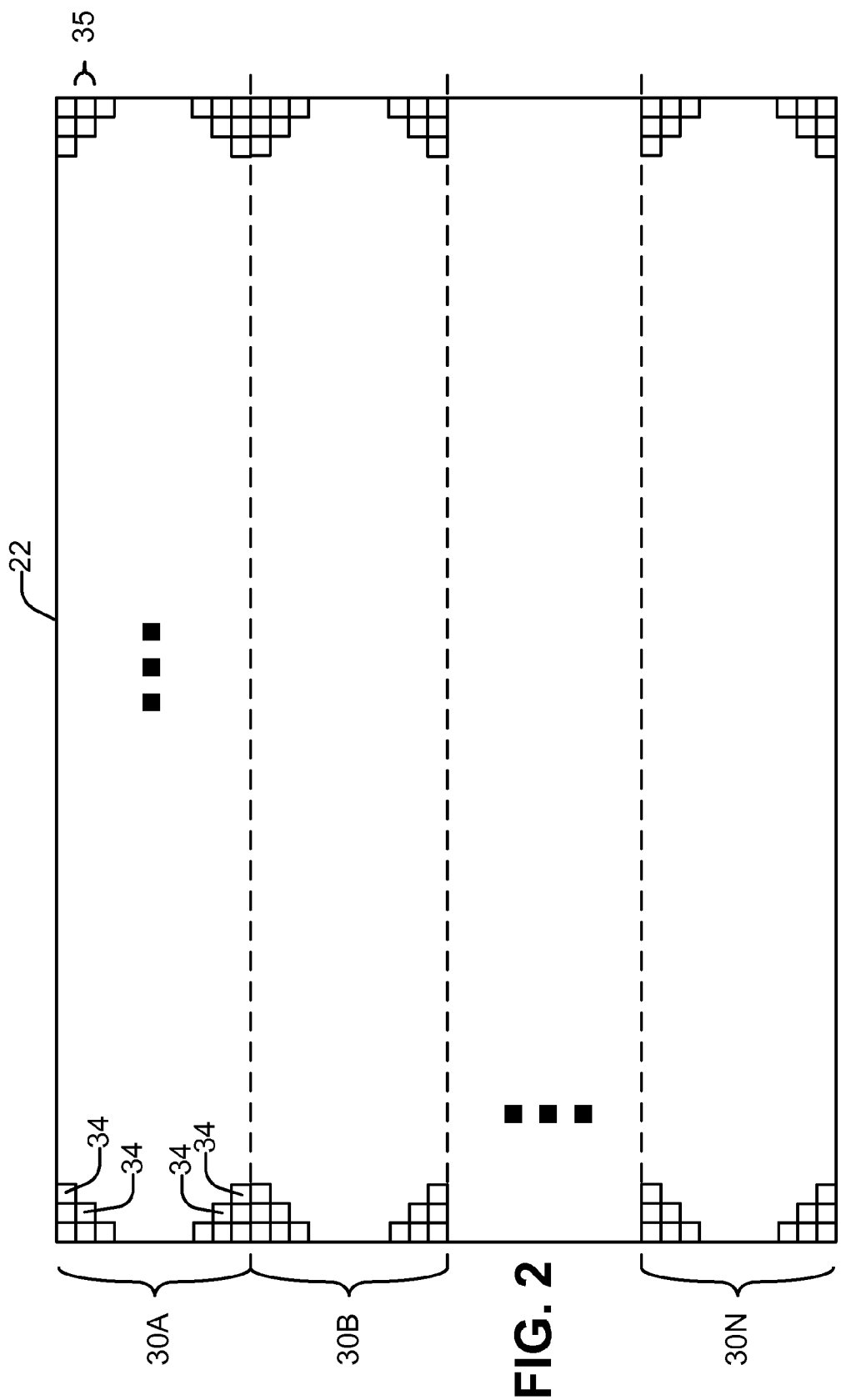
FIG. 2 is a schematic representation of contone image data printable using the printer of FIG. 1 in accordance with an embodiment of the present disclosure.

Considering now in further detail the contone image data 22, and with further reference to FIG. 2, the data 22 is arranged in a row-and-column format array of individual pixels 34. For clarity, a small number of such pixels 34 are illustrated, although it is understood that such pixels exist throughout the data 22 in a two-dimensional row-and-column arrangement. For example, row 35 is one such row of pixels 34. For data compression performed by the compressor 20, image data 22 can be divided into N uncompressed multi-row strips 30, such as the strips denoted 30A through 30N. Each strip 30 encompasses all the pixels 34 of a number of rows. In some examples, a strip 30 may encompass all the pixels 34 of 64 or 128 rows.

Figure 3:
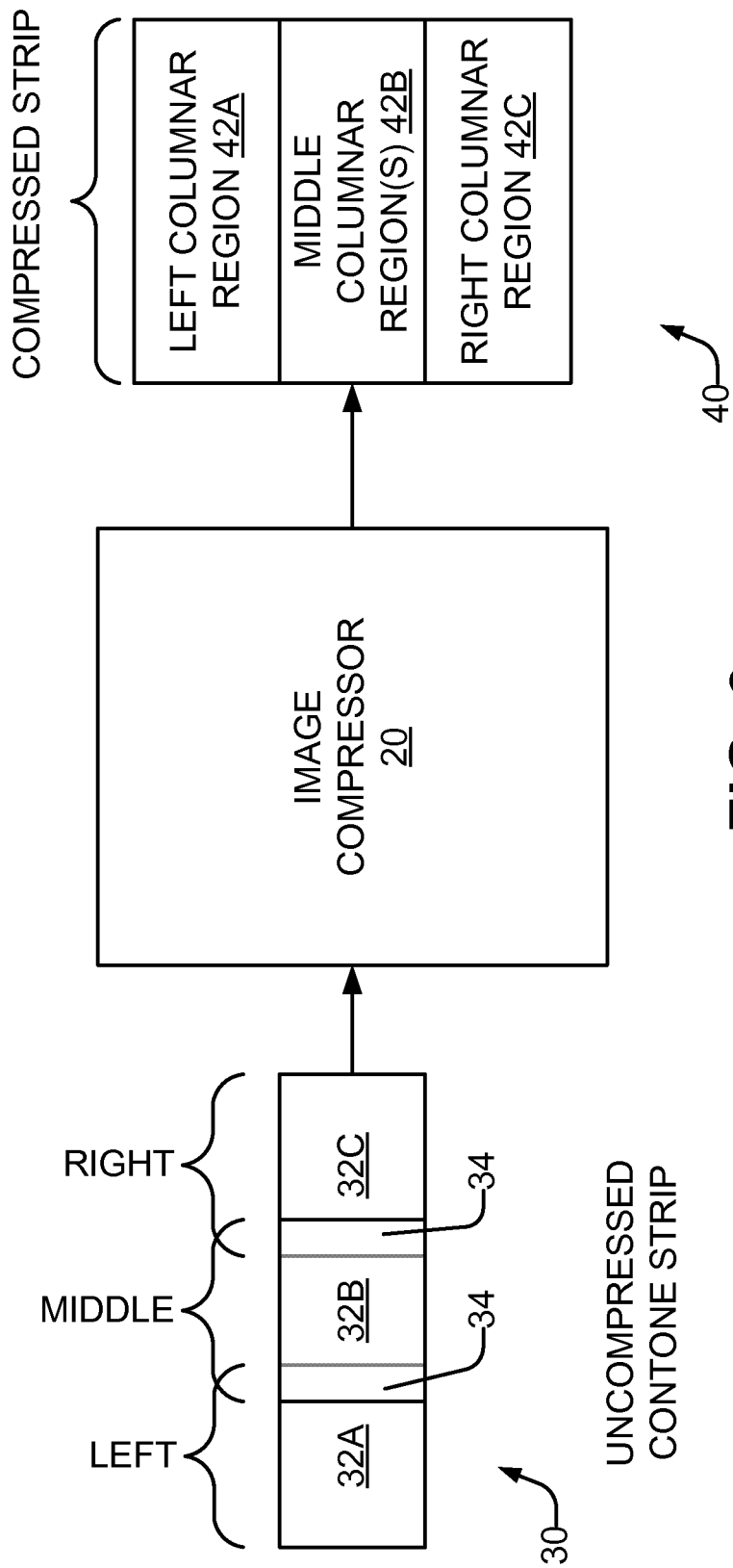
FIG. 3 is a schematic representation of an image compressor of the printer of FIG. 1 and its operation in accordance with an embodiment of the present disclosure.

Considering now in further detail the operation of the compressor 20, and with further reference to FIG. 3, the compressor 20 configures an uncompressed strip 30 into one or more multi-column columnar regions 32 for compressing. In some examples, the compressor 20 divides an uncompressed strip 30 into a plurality of overlapping multi-column columnar regions 32 for compressing. Each region 32 includes a plurality of columns of individual pixels 34. FIG. 3 illustrates a strip 30 that is configured into left 32A, middle 32B, and right 32C overlapping columnar regions, having boundaries indicated by braces ("{"). Middle region 32B represents zero to N middle regions; some example strips 30 have left and right columnar regions 32A, 32C with zero middle regions 32B, while other example strips 30 have multiple middle regions 32B. The pixels 34 in overlap areas 36 are included in the two overlapping regions 32, which will be discussed subsequently in greater detail with reference to FIG. 5.

After a columnar region 32 of the uncompressed strip 32 has been identified, the compressor 20 converts the columnar region 32 into a compressed columnar region 42 of a compressed multi-row strip 40. The compressor 20 may utilize one or more of a variety of different compression techniques such as, for example, JPEG, JPEG 2000, and LZW, among a variety of others. In some examples, a compressed columnar region 42 may contain a single plane in which the compressed R, G, and B values of the pixels are interleaved. In other examples, a compressed columnar region 42 may contain separate planes for the R, G, and B pixel values. Where the uncompressed columnar region 32 is an overlapping region, the compressed columnar region 42 will similarly be an overlapping region.

With further reference to FIG. 1, the compressed strip 40 may be stored in a compressed image data memory 46. In some situations, a number of compressed strips 40 may be stored in the memory 46 before downstream processing of the compressed strips 40 begins. For example, a number of compressed strips 40 corresponding to a full page image to be printed may be stored before downstream processing begins.

The printer 10 includes an image pipeline 50 that is configured to serially process each compressed columnar region 42 of a selected one of the compressed strips 40 so as to generate print data 80 that corresponds to the columnar region 42 for a selected one of the colorizers 18, and store the print data 80 in a print data memory 90.

Figure 4:
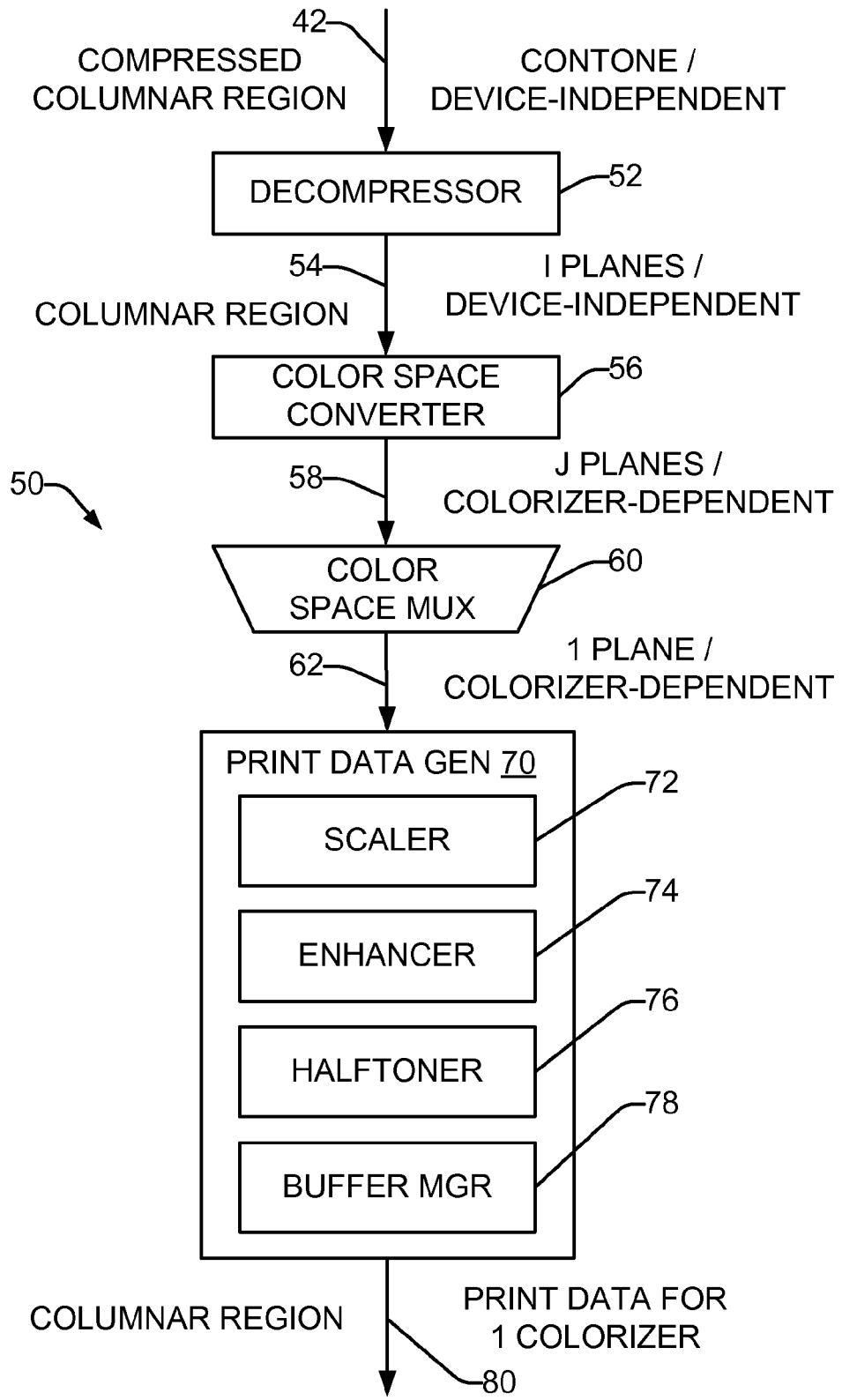
FIG. 4 is a block diagram representation of an image pipeline of the printer of FIG. 1 in accordance with an embodiment of the present disclosure.

Considering now in further detail the image pipeline 50, and with further reference to FIG. 4, the pipeline has a number of stages that process a compressed columnar region 42. As defined herein and in the appended claims, a "pipeline" shall be broadly understood to mean an element in which stages thereof execute (in hardware, software, or a combination of both) substantially in parallel on different transformations of data which are serially forwarded through the pipeline from stage to stage. A compressed columnar region 42 enters a decompressor stage 52 that decompresses the region 42 to generate decompressed device-independent contone data 54 for the columnar region. In some examples, the device-independent data 54 is organized into a number I of planes. For example, where the device-independent data 54 is organized in this manner, there may be three separate planes of R, G, and B values of the pixels 34 in the device-independent data 54. The device-independent data 54 then enters a color space converter stage 56 that converts the data 54 into a number J of planes of colorizer-dependent data 58 for the columnar region. For example, this may be four separate planes of C, M, Y, and K values of the pixels 34 in the decompressed columnar region data 54. The J planes of colorizer-dependent data 58 is provided to a color space multiplexor 60. The multiplexor 60 selects one of the J planes for processing by a print generator stage 70. From the pixels of the selected plane of colorizer-dependent data 58, the print generator stage 70 generates corresponding pixels of print data 80 for that particular colorizer 18 which corresponds to the selected one of the J planes. Typically, the print data 80 has control signals for the colorizer 18 that will cause the colorizer 18, when the control signals are applied, to deposit on the print medium 16 the appropriate amounts of that colorant 14 that correspond to the values of the various pixels of the image. As will be discussed subsequently in greater detail with reference to FIG. 5, where there are plural compressed columnar regions 42 per compressed strip 40 such that the compressed columnar regions 42 are overlapping, the print data 80 corresponds to the pixels 34 of a cropped portion of an uncompressed columnar region 32.

The print generator stage 70 may include a number of sub-stages. A scaler sub-stage 72 can scale the selected plane of colorizer-dependent data 58 in the row and/or column directions. For example, the scaler 72 can convert 300 dpi data into 600 dpi data by performing a 2× scaling operation, or into 1200 dpi data by performing a 4× scaling operation. Other amounts of scaling may be performed in some examples, including a different amount of scaling in the row direction from the column direction. An enhancer sub-stage 74 can process the colorizer-dependent data 58 to improve the quality of the image as printed. A halftoner sub-stage 76 halftones the data to a resolution consistent with print data for the colorizer 18, and may further improve the quality of the image that will be produced by the print data. A buffer manager sub-stage 78 finalizes the formatting of the print data 80 and stores it in a print data memory 90 (FIG. 1).

Figure 5:
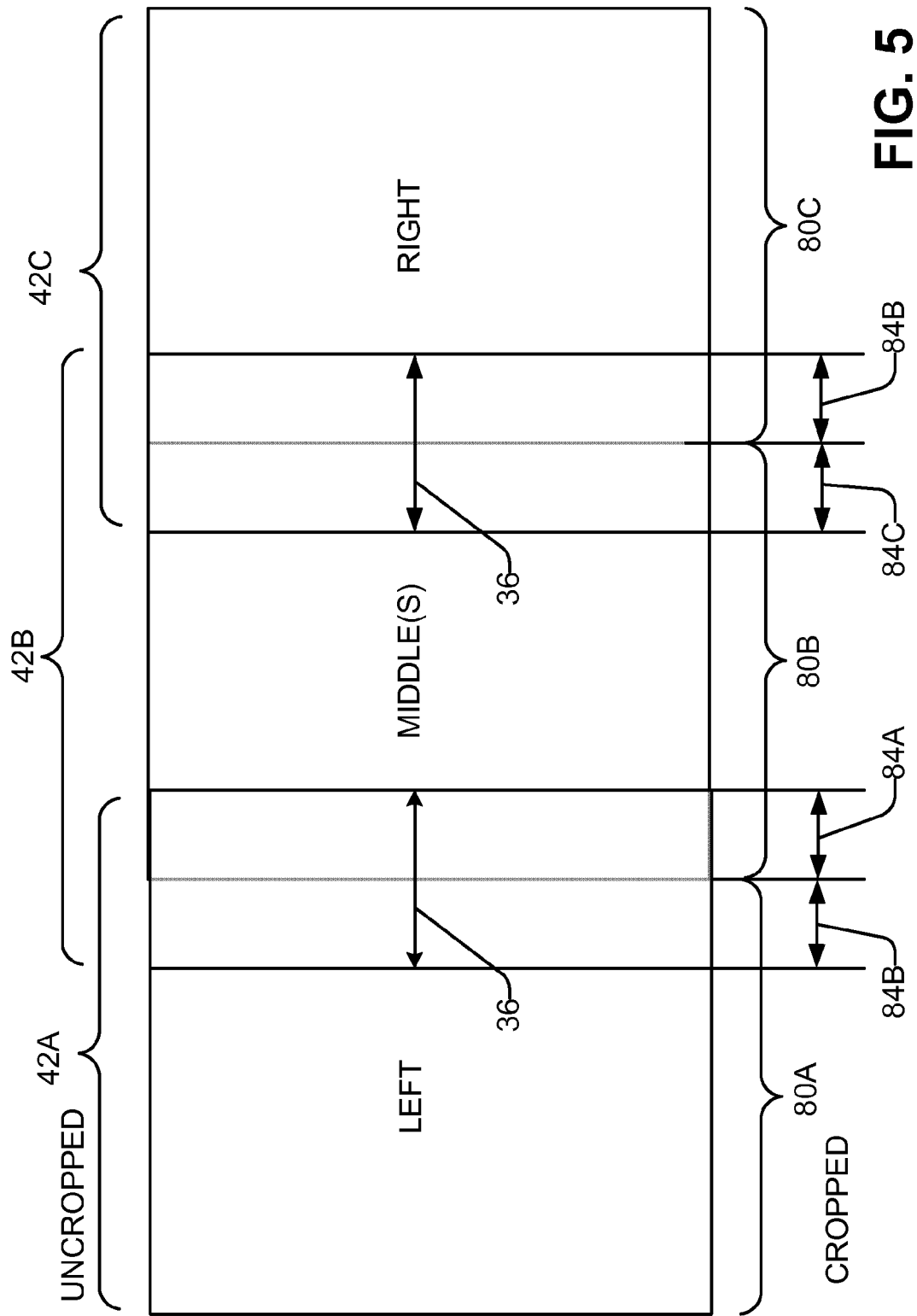
FIG. 5 is a schematic representation of the processing of overlapping columnar regions of a strip of image data to form cropped columnar regions of print data using the printer of FIG. 1 in accordance with an embodiment of the present disclosure.

Considering now the print data 80 corresponding to overlapping columnar regions such as, for example, regions 42A-C in greater detail, and with reference to FIG. 5, as discussed heretofore the image pipeline 50 processes overlapping columnar regions 42 of contone data and generates cropped columnar regions 80 of print data for a particular colorizer 18. The buffer manager sub-stage 78 of the image pipeline 50 performs the cropping operations that eliminate the overlap. For example, overlapping columnar regions 42A-C are processed to generate cropped columnar regions 80A-C respectively. The columnar regions 42A-C are defined to include the overlap 36 because various operations performed by the print data generator 70, such as for example those performed by the enhancer 74 and/or the halftoner 76, may be performed on a sliding window of data through which the print data value of one pixel may be determined at least in part by the values of its neighboring pixels. Since each overlapped columnar region 42 is processed serially by the image pipeline 50 to generate corresponding cropped columnar region 80, the overlap 36 is of sufficient width to include those data pixels of adjacent columnar regions 42 that affect the print data 80 for the columnar region 42 being processed. Left 42A and right 42C overlapped columnar regions have one area of overlap, while middle overlapped columnar region(s) 42B have two areas of overlap.

Left cropped column 80A is generated by cropping area 84A from the print data. Middle cropped column(s) 80B are generated by cropping two areas 84B from the print data. Right cropped column 80C is generated by cropping area 84C from the print data. The resulting width of a cropped columnar region of print data 80 is the width of the overlapped columnar region 42 minus the corresponding cropped area(s) 84.

In some examples, all overlapped columnar regions 42A-C processed through the pipeline may have the same width. In this case, the resulting middle cropped columnar regions 80B will be narrower than left 80A and right 80C cropped columnar regions. In other examples, the cropped columnar regions 80A-C output by the image pipeline 50 may all have the same width. In this case, middle overlapped columnar regions 42B will be wider than left 42A and right 42C overlapped columnar regions. Other variations in width are also possible.

Figure 6:
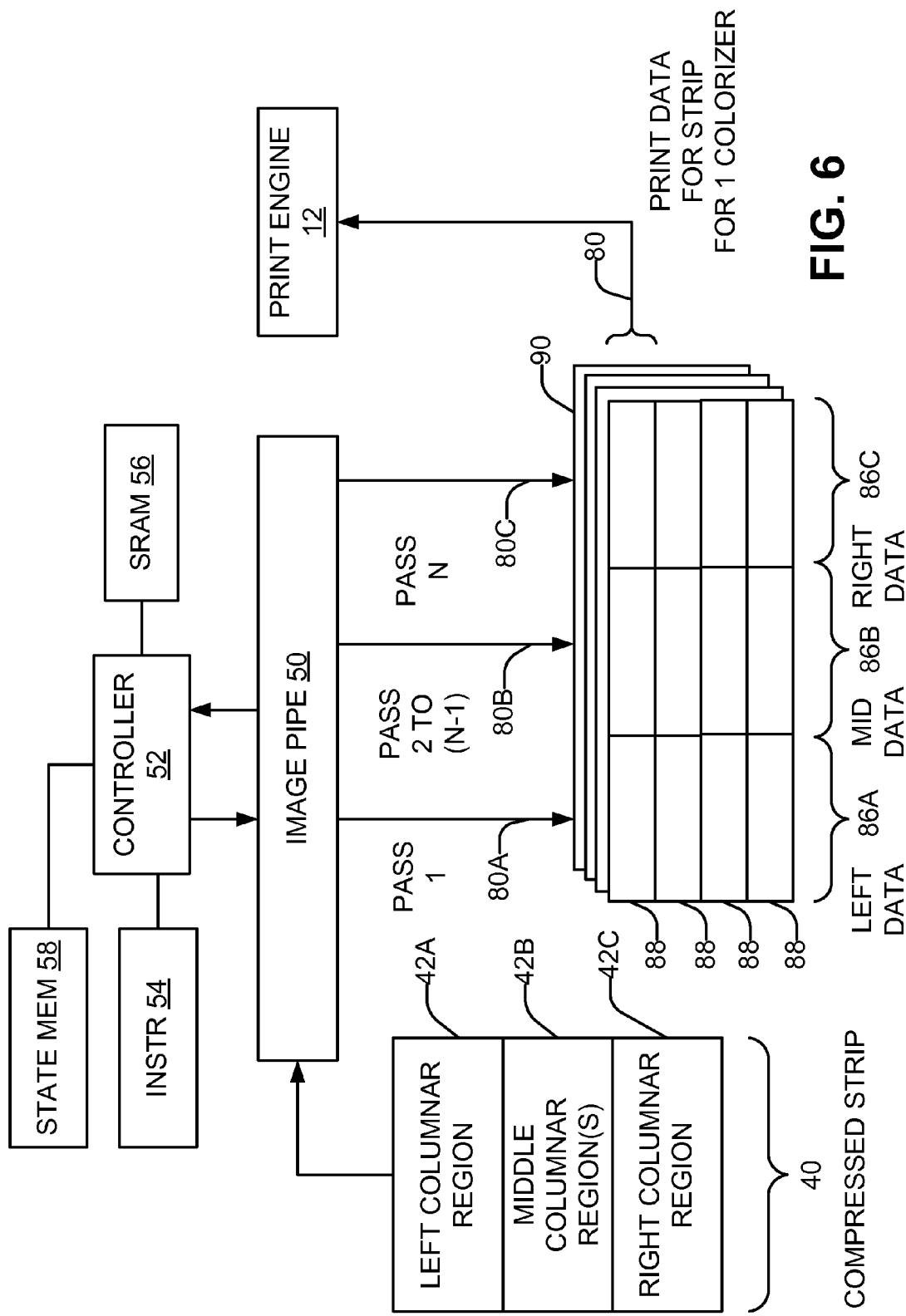
FIG. 6 is a schematic representation of the sequential processing of the columnar regions of a strip of image data through the image pipeline of FIG. 5 in accordance with an embodiment of the present disclosure.

Considering now in greater detail the print data buffer memory 90, and with reference to FIG. 6, the print data memory 90 is logically organized as one plane per colorizer 18 of print data 80 in row-and-column format. The image pipeline 50 stores the print data 80 generated for a particular colorizer 18 into the corresponding plane of the memory 90.

The memory 90 typically has a depth sufficient to store a number of strips 88 of the print data 80, where each strip 88 of print data corresponds to a strip 30 of image data 22. In an example configuration where a strip 30 is divided into plural columnar regions 32A-C and compressed to form plural columnar regions 42A-C, the buffer manager sub-stage 78 of the image pipeline 50 stitches the print data 80A-C generated for each columnar region 42 into locations in a corresponding column 86A-C of the proper plane of the memory 90. For example, the left columnar region 42A is processed by the image pipeline 50 in pass 1 to generate print data 80A which is stored in the memory locations of column 86A of a particular strip 88. Similarly, the middle columnar region(s) 42B are processed by the image pipeline 50 in passes 2 to (N−1) to generate print data 80B which is stored in the memory locations of column(s) 86B of the particular strip 88. The right columnar region 42C is processed by the image pipeline 50 in pass N to generate print data 80C which is stored in the memory locations of column 86C of the particular strip 88.

In another example configuration where a strip 30 has a single columnar region 32, and a corresponding compressed strip 40 has a single compressed columnar region 42, the columnar region 42 is processed by the image pipeline 50 in a single pass to generate print data which is stored in the memory locations of the particular strip 88.

In configurations where the print engine 12 has plural colorizers 18, a strip 30 may be processed multiple times, consecutively or non-consecutively, to generate the print data for all of the colorizers 18.

In some examples, the size of the memory 90 can be optimized based on the speed and width of the print engine 12 in order to reduce or minimize the cost of the printer 10.

When all of the print data 80 for one particular strip 88 associated with a particular colorizer 18 has been generated and stored in the memory 90, it is available for consumption by the colorizer 18 of the print engine 12 to deposit the corresponding colorant 14 on the print medium 16.

Considering now in greater detail the processing of a compressed strip 40, and with continued reference to FIG. 6, the operations of the image pipeline 50 are orchestrated by a controller 52. The controller 52 may be a microcontroller implemented in an ASIC 100 that includes the image pipeline 50. The controller 52 is configured to execute at least one instruction stream stored in an instruction memory 54 accessible by the controller 52 to dynamically reprogram the pipeline 50 to serially process each of the columnar regions 42 of the selected strip. The instruction memory 54 may be located within the ASIC 100, or may be a component external to the ASIC 100 and communicatively coupled to the ASIC 100. The controller 52 also can access SRAM memory 56 in the ASIC 100. The SRAM memory 56 is typically used for storing intermediate data generated and used by the image pipeline 50. In some examples, the amount of SRAM memory 56 may correspond to a predetermined maximum width of a columnar region 42 that can be processed by the image pipeline 50.

The controller 52 dynamically reprograms the image pipeline 50 for each of the columnar regions 42 by loading into the pipeline 50 previously-saved state data associated with the columnar region 42 from a state memory 58 before the columnar region 42 is processed, and saving modified state data associated with the columnar region 42 in the state memory 58 after the print data 80 for the columnar region 42 is generated. The state memory 58 is typically external to the ASIC 100, but may alternatively be located within the ASIC 100. For a given strip 40, the state data loaded from the state memory 58 for a columnar region 42 typically includes data associated with one or more rows, adjacent to the given strip, of the columnar region for the previously-processed strip. This data is used by the print data generator 70 in the sliding window operations performed by the rows of the given strip that are adjacent to the previously-processed strip, in order to properly account for the effect on pixels, in these rows of the given strip, of neighboring pixels in the previously-processed strip. The state data may also include information about the state of the various sub-systems of the image pipeline 50 sufficient to properly enable processing of the particular columnar region 42 (i.e. left, middle, or right).

Figure 7:
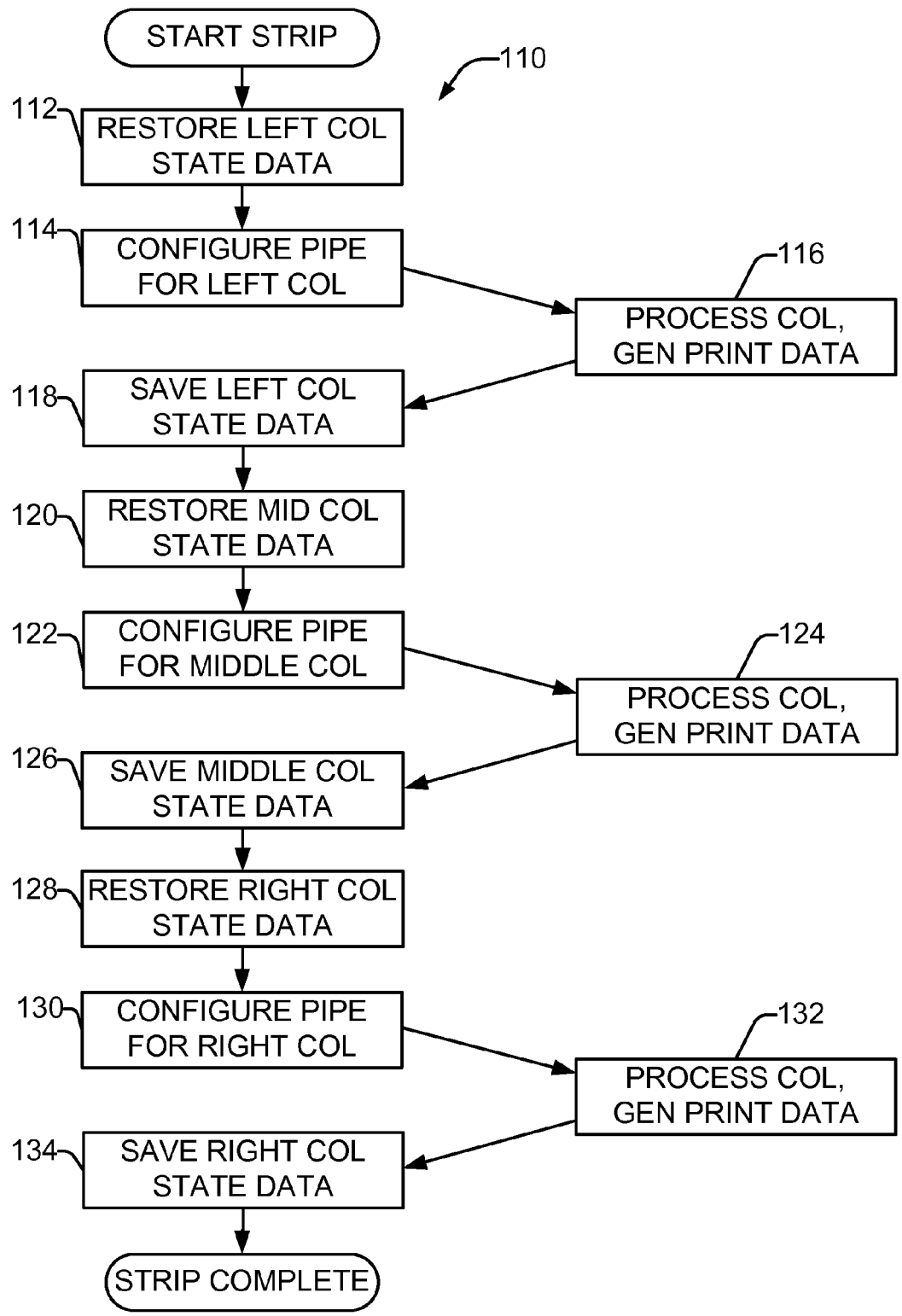
FIG. 7 is a schematic representation of an example instruction stream and its execution by a controller 52 of the printer of FIG. 1 in accordance with to an embodiment of the present disclosure.

Considering now the execution of an example instruction stream 110 by the controller 52, and with reference to FIG. 7, the instruction stream 110 is dependent on the number of columnar regions 42 that comprise a compressed strip 40. The example instruction stream 110 is configured to cause the controller 52 and image pipeline 50 to process three columnar regions 42—left 42A, one middle 42B, and right 42C—per compressed strip 40. At 112, the controller 52 restores the state data for the left columnar region 42A to the image pipeline 50 from the state memory 58. At 114, the image pipeline 50 is configured to process the left columnar region 42A. Configuring the image pipeline 50 typically includes setting up various control registers and tables of the image pipeline 50 and initializing the various image pipeline sub-stages for processing the region. Following configuration, the image pipeline 50 processes the columnar region 42A, generates print data 80A, and stores the print data 80A in the print data memory 90 at column 86A for the appropriate strip 88. The image pipeline processing is initiated by the controller 52 signaling the image pipeline 50 to process 116 the columnar region 42A. While the image pipeline 50 is processing the columnar region 42A to generate print data 80A, the controller 52 waits for a "region completed" signal from the image pipeline 50. In some examples, the controller 52 may perform administrative tasks while awaiting this signal from the image pipeline 50. For example, this may include evaluating at least one of an availability of the planes of the memory buffer 90 associated with the various colorizers 18 for receiving print data 80; a time that the various colorizers 18 have been waiting for print data 80; and a next strip to be processed for each of the colorizers 18.

After the print data 80A has been generated and stored, the image pipeline 50 sends the "region completed" signal to the controller 52, indicating that the processing of columnar region 42A has been completed. In response, the controller 52 saves, in the state memory 58, state data usable for processing the next left columnar region 42A.

The middle columnar region 42B is similarly processed by instructions 120, 122, and 126, and operation 124. The right columnar region 42C is also similarly processed by instructions 128, 130, and 134, and operation 132. After all the columnar regions 42 of a strip 40 have been processed and the corresponding print data 80 stored in memory 90, the controller 52 or the image pipeline 50 may send a "strip completed" signal to the print engine 12 to inform the engine 12 that a strip of print data 80 for a particular colorizer 18 is available to be printed. Then, as will be discussed subsequently in greater detail, the memory plane availability, colorizer wait time, and next strip identification may be utilized by the controller 52 to dynamically select the strip 40 and the colorizer 18 to be used for the next strip processing operation by the image pipeline 50. The sequence of strips 40 and colorizers 18 dynamically selected by the controller 52 collectively generates print data 80 for all of the colorizers 18 and for all of the strips 40 of the image data 22.

Another example instruction stream that may alternatively or additionally be stored in instruction memory 54 is configured to cause the controller 52 to process an entire compressed strip 40 as a single columnar region 42. Such an instruction stream is similar to, but simpler than, the instruction stream 110 illustrated in FIG. 7. For example, the controller 52 first restores the state data for the strip 40 to the image pipeline 50 from the state memory 58. Next, the image pipeline 50 is configured to process the entire strip 40 as a single columnar region 42. The image pipeline processing is initiated by the controller 52 signaling the image pipeline 50 to process the single columnar region 42. While the image pipeline 50 is processing the single columnar region 42 to generate print data 80 for the strip 40, the controller 52 waits for the "region completed" signal from the image pipeline 50. The controller 52 may perform administrative tasks, as have been previously described, while awaiting this signal from the image pipeline 50. After the print data 80 has been generated and stored, the image pipeline 50 sends the "region completed" signal to the controller 52, indicating that the processing of the single columnar region 42 has been completed. In response, the controller 52 saves, in the state memory 58, state data usable for processing the columnar region 42 of the next strip 40. Since there is only one columnar region 42 in the strip 40, the image pipeline 50 may send a "strip completed" signal to the print engine 12 to inform the engine 12 that a strip of print data 80 for a particular colorizer 18 is available to be printed. Then, as will be discussed subsequently in greater detail, the memory plane availability, colorizer wait time, and next strip identification may be utilized by the controller 52 to dynamically select the strip 40 and the colorizer 18 to be used for the next strip processing operation by the image pipeline 50. The sequence of strips 40 and colorizers 18 dynamically selected by the controller 52 collectively generates print data 80 for all of the colorizers 18 and for all of the strips 40 of the image data 22.

Considering now in greater detail the configuring of the image pipeline 50 to process a strip in N columnar regions 42, and with reference back to FIG. 1, the printer 10 includes a configurer 140. The configurer 140 programmatically configures the pipeline 50 to process a strip 40 in N columnar regions 42 by generating a corresponding instruction stream 110 and storing it in the instruction memory 54. As has been described heretofore, the image pipeline 50 may process columns 42 of a predetermined maximum width, in order to reduce the amount of memory and logic in an ASIC 100 for the image pipeline 50, and to allow a single ASIC 100 to be used in a variety of printers having a range of different media size and print resolution requirements. Where processing of a strip 40 would result in generation of print data 80 that is wider than the maximum width of the image pipeline 50, the strip 40 may be divided up into multiple columnar regions 42, instead of a single columnar region 42, for processing. The configurer 140 also configures and generates the instruction stream that is executed by the controller 52 which controls the image pipeline 50.

The number N of columnar regions 42 into which a strip 40 is divided may be determined based on the maximum width, a specified size of the print medium 16, and a specified print resolution at which the print data 80 is to be printed. The media size and/or the print resolution may be predetermined for a given printer 10; may be determined as part of the power-up sequence of the printer 10; or may be specified by the user. For example, the user may enter these parameters via a user interface of the printer. The printer 10 may have a keyboard and display (not shown) usable for this purpose, or other mechanisms. For example, the printer may determine the media size from an adjustment made by the user of media tray to fit the desired media in the printer. The number N of columnar regions 42 into which a strip 40 will be divided may be determined by dividing the number of individually printable elements (e.g. "dots") in a full-width row of the print data 80 by the predetermined maximum width of the image pipeline 50.

Once the number N has been ascertained, the configurer 140 can generate an instruction stream 110 corresponding to N, and store it in the instruction memory 54. The instruction memory 54 typically includes a different instruction stream 110 for each colorizer 18. For the most part, the different instruction streams 110 are similar, but for image quality reasons the image pipeline 50 may have some different control register and/or table settings associated with the different colorizers 18. If there are no differences between the instruction streams 110 associated with the different colorizers 18, a common instruction stream 110 can be used by the controller 52 for all colorizers 18. The controller 52 uses the appropriate instruction stream 110 corresponding to the particular colorizer 18 for which print data 80 for a strip 40 is being generated by the image pipeline 50.

In some examples, the configurer 140 includes a processor 142 coupled to a memory 144 which contains firmware instructions that, when executed by the processor 142, determines the media size and print resolution, calculates the number N of columnar regions per strip, generates the instruction stream 110, and stores the stream 110 in the instruction memory 54.

Figure 8:
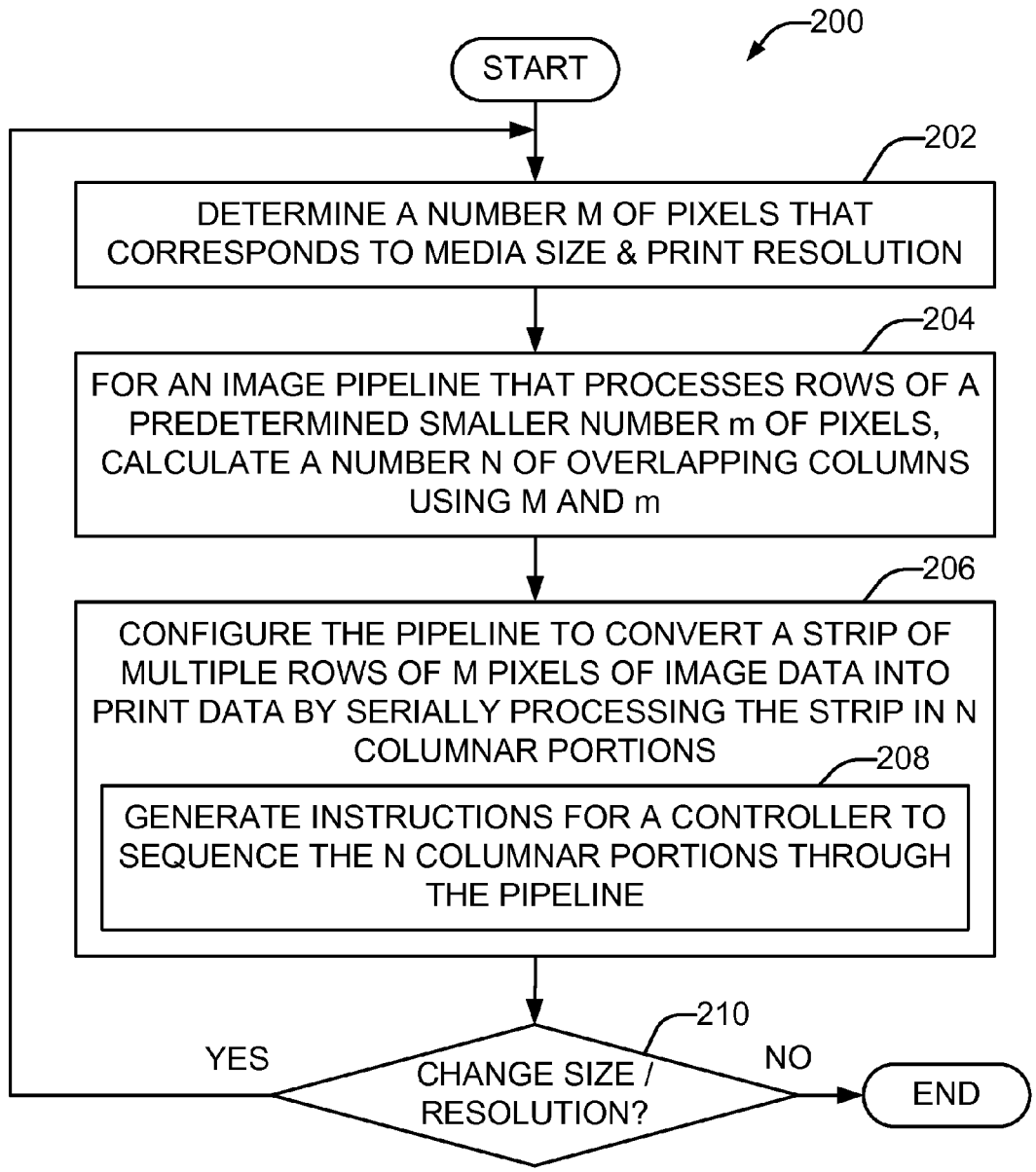
FIG. 8 is a flowchart in accordance with an embodiment of the present disclosure of a method of configuring a printer for a desired media size and print resolution.

Another example of the present disclosure, as best understood with reference to FIG. 8, is a method 200 of configuring a printer 10 for a desired media size and print resolution. In some scenarios, the flowchart of FIG. 8 may be considered as steps in a method implemented in the printer 10, such as by one or more of controller 52 and processor 142 executing instructions in instruction memory 54 and memory 144 respectively.

The method 200 begins, at 202, by determining a number M of pixels corresponding to the media size and the print resolution of a row of contone image data 22. At 204, for an image pipeline 50 of the printer 10 that is configured to process image rows of a predetermined smaller number m of pixels 34, a number N of overlapping columns 32 is calculated based on M and m. At 206, the image pipeline 50 is configured to convert a strip 30 of multiple rows of M pixels 34 of contone image data 22 into print data 80 corresponding to the strip 30. The image pipeline 50 converts the strip 30 by serially processing a compressed version 40 of the strip 30 in N columnar portions or regions 42. In some examples, the method 200 includes, at 208, generating instructions 110 for a controller 52 of the image pipeline 50. The instructions 110 sequence the N columnar portions 42 of the strip through the pipeline 50. In some examples, the method 200 includes, at 210, repeating the determining 202, calculating 204, and configuring 206 so as to reconfigure the image pipeline 50 to accommodate at least one of a different media size or a different print resolution set for the printer 10.

Figure 9A:
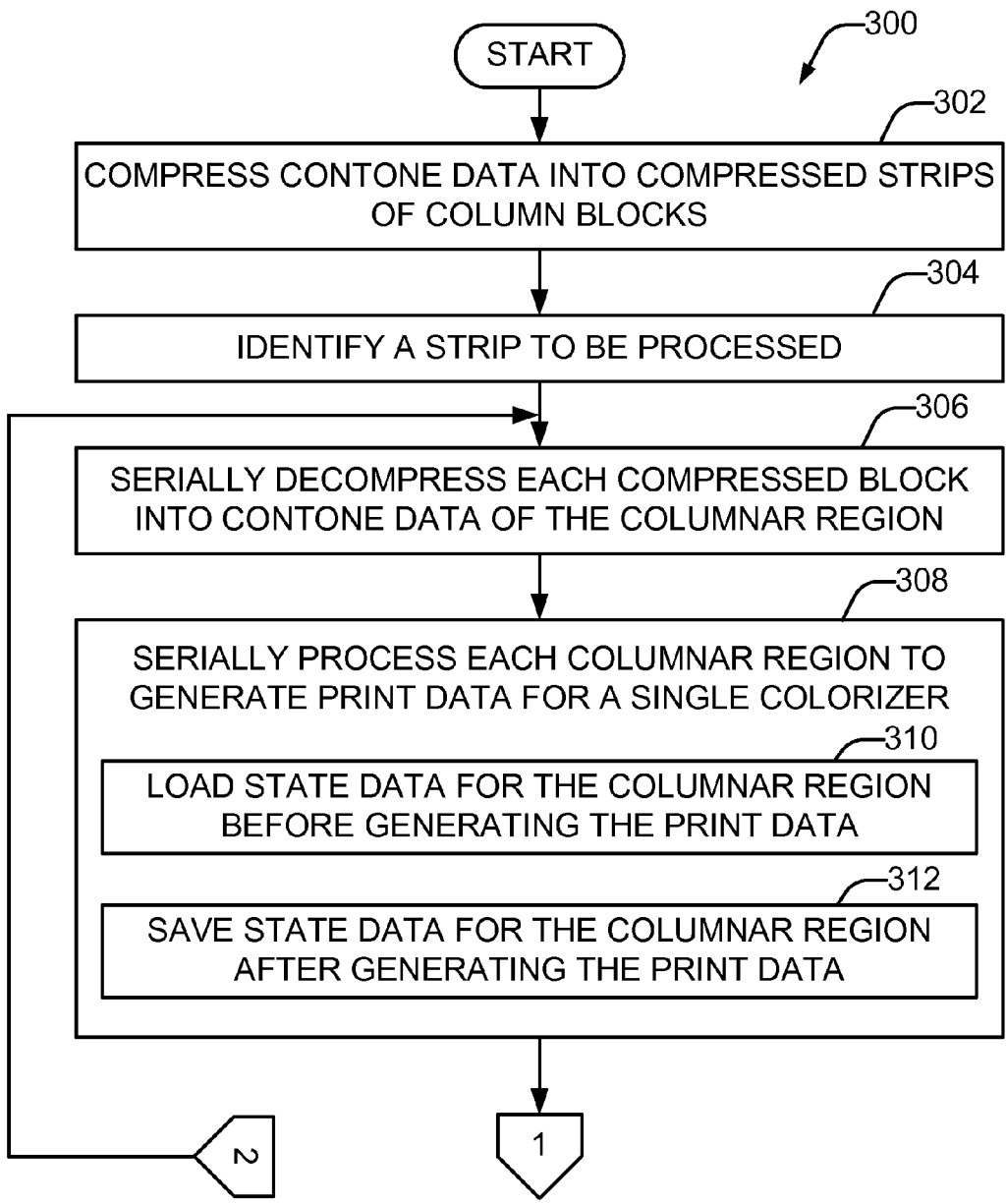
FIGS. 9A-B are flowcharts in accordance with an embodiment of the present disclosure of a method of printing, with a printer having at least one colorizer, contone data representing pixels of an image in a row-and-column format.
Figure 9B:
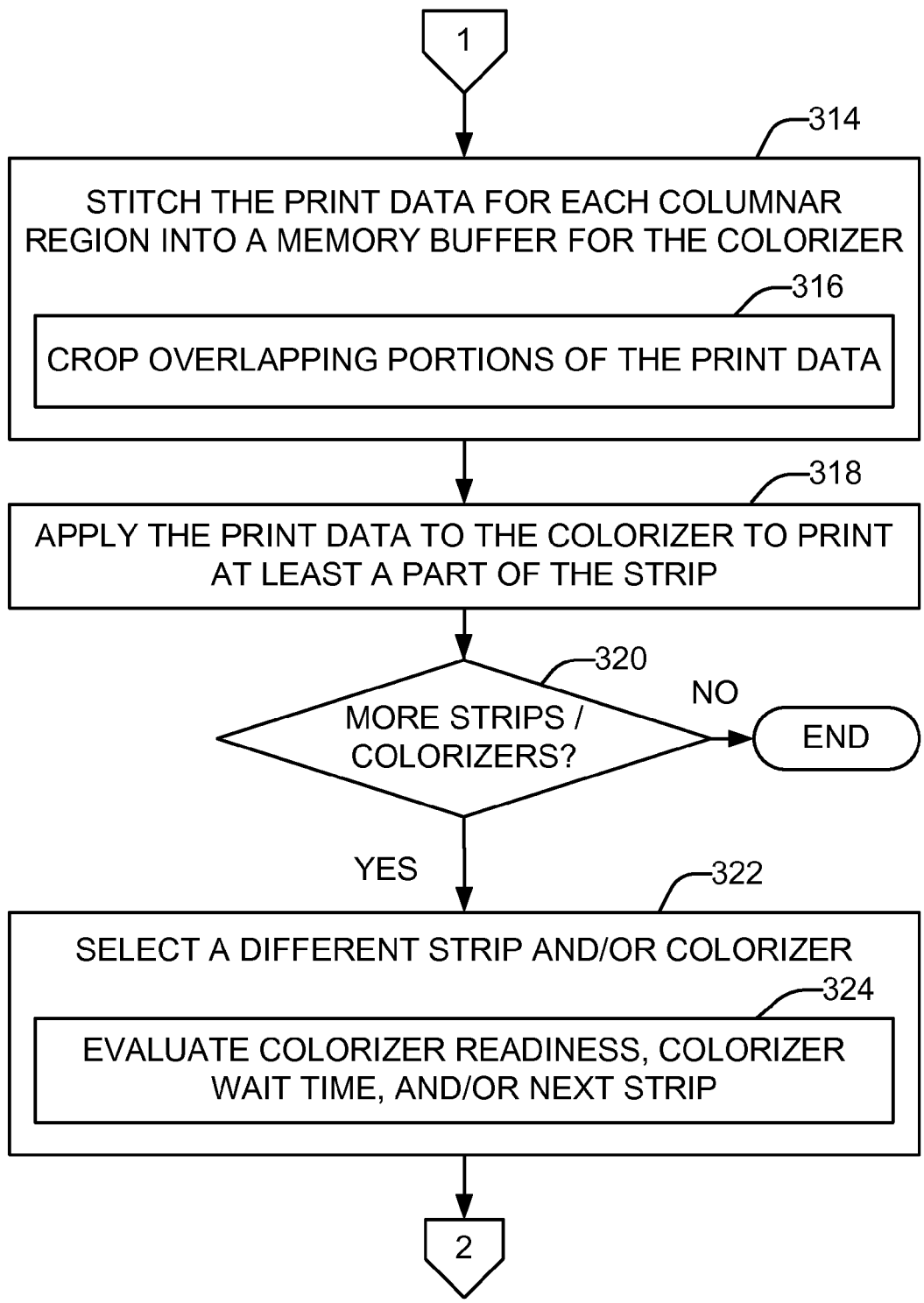

Yet another example of the present disclosure, as best understood with reference to FIGS. 9A-B, is a method 300 of printing, with a printer 10 having at least one colorizer 18, contone data 22 representing pixels 34 of an image in a row-and-column format. In some scenarios, the flowchart of FIG. 9 may be considered as steps in a method implemented in the printer 10, such as by one or more of controller 52 and processor 142 executing instructions in instruction memory 54 and memory 144 respectively.

The method 300 begins, at 302, by compressing the contone data 22 corresponding to overlapping multi-column columnar regions 32 of a multi-row strip 30 into a set of compressed column blocks 42 of a compressed strip 40. In some examples, the contone data for all of the strips of a page may be compressed before any strip is decompressed at 306. At 304, a strip of the contone data is identified. At 306, each of the compressed column blocks 42 corresponding to the identified strip is serially decompressed into the contone data 54 of the corresponding columnar region 32. At 308, the contone data 54 of each region 32 of the strip 30 is serially processed through an image pipeline 50 to generate print data 80 corresponding to the strip for a single one of the colorizers 18 by dynamically reprogramming the image pipeline 50 for the processing of each region 32. At 310, in some examples, state data associated with the columnar region 32 is loaded prior to generating the print data 80, and state data associated with the columnar region 32 is saved, at 312, after generating the print data 80. At 314, the print data 80 generated for the columnar region 32 of the single colorizer 18 is stitched into a corresponding columnar position 86 of a memory buffer 90 for the colorizer 18, where the memory buffer 90 is organized in the row-and-column format of the image data 22. At 316, the stitching includes cropping from the print data 80 a columnar portion 84 that overlaps an adjacent columnar region. At 318, after the print data 80 for all the columnar regions 32 of the strip has been placed into the memory buffer 90, at least a part of the strip is printed on a print medium 16 by applying the generated print data 80 from the memory buffer 90 to the colorizer 18 to deposit the colorant 14 on the print medium 16. If no more strips and no more colorizers remain to be processed ("No" branch of 320), then the method 300 concludes. If more strips, or more colorizers for the present strip, remain to be processed ("Yes" branch of 320), then at 322 at least one of a different multi-row strip or a different one of the colorizers 18 is selected, and processing is repeated by branching to 306. In some examples, this selecting includes, for at least one particular colorizer, evaluating at least one of an availability of the memory buffer 90 of the particular colorizer 18 for receiving print data 80, a time that the particular colorizer 18 has been waiting for print data 80, and a next multi-row strip to be processed for the particular colorizer 18.

As has been previously discussed, in some examples the print engine 12 of the printer 10 color laser printer uses four colorizers 18 to print the contone image data 22. One typical physical configuration of multiple colorizers within a print engine is an inline arrangement, in which the print data 80 generated from the contone image data 22 is delivered to the print engine 12 in one pass.

Figure 10:
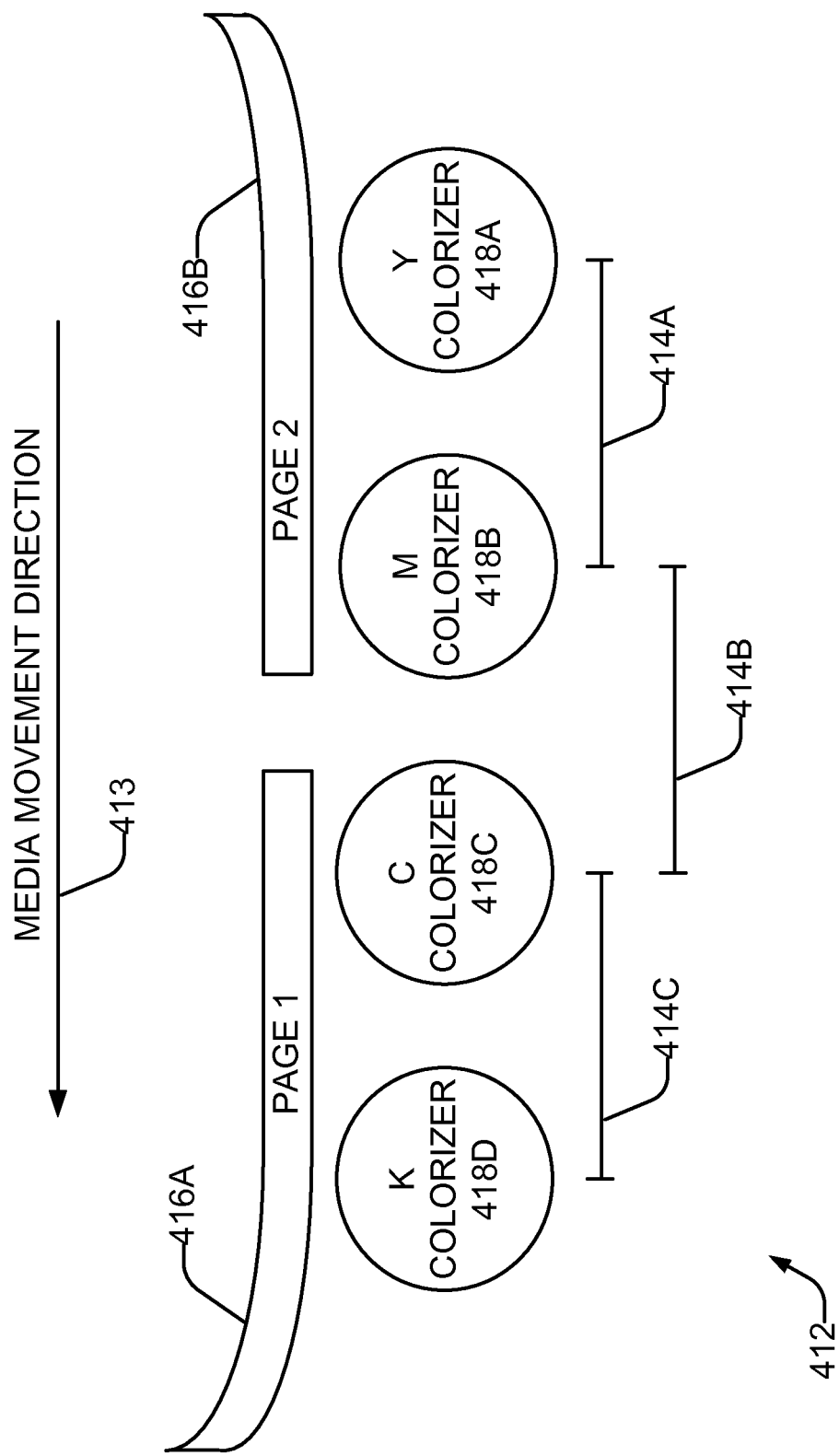
FIG. 10 is a schematic representation in accordance with an embodiment of the present disclosure of an example inline print engine having four spaced-apart colorizers for printing on pages of media.

Considering now an example inline print engine 412, and with reference to FIG. 10, an inline print engine 412 for printing on plural pages, such as on a first page 416A followed by a second page 416B. The pages 416A-B flow through the print engine 412 in a media movement direction 413. In the example inline print engine 412, colorizer 418A prints yellow (Y) colorant, colorizer 418B prints magenta (M) colorant, colorizer 418C prints cyan (C) colorant, and colorizer 418D prints black (K) colorant. The colorizers 418 are separated by a physical distance 414 one from another. In some examples, the physical distances 414 (the "colorizer gap") between colorizers 418 may be in the range of three to four inches. The physical distances 414A-C may be the same distance, or different distances.

This configuration results in page overlap. In other words, at some point in time some colorizers, such as for example colorizers 418A-B, are printing the print data on the top portion of second page 416B, while other colorizers, such as for example colorizers 418C-D, are printing the print data on the bottom portion of first page 416A.

Figure 11A:
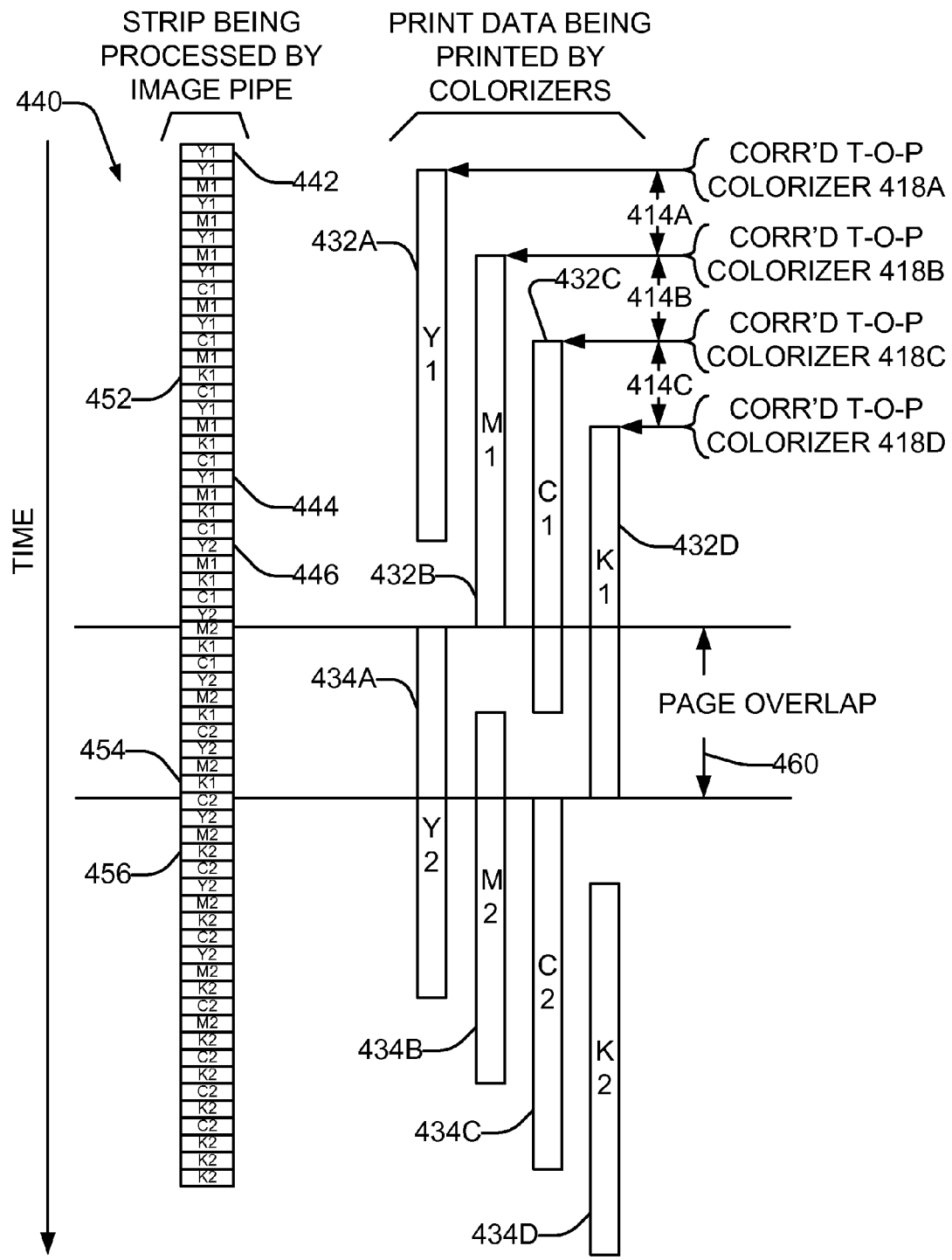
FIG. 11A is a schematic representation in accordance with an embodiment of the present disclosure of an example sequencing of strips of print data through an image pipeline and of the printing of this data with an inline print engine.

Thus it can be appreciated that, in this configuration, the print data 80 for a particular strip 88 should be delivered to the various colorizers 418 in an overlapping manner, as can be appreciated from FIG. 11A. However, the print data 88 for each colorizer 418 should also be delivered to that colorizer 418 offset in time (i.e. staggered) relative to the other colorizers 418 in order to properly synchronize the printed output.

One design technique to provide print data in an overlapping but staggered manner is to use a separate image pipe per colorizer 418. This image pipe could be a variation of the image pipe 50, such as one from which the color space mux 60 is omitted. In this architecture, each pipe receives the same compressed columnar region 42 of contone data, but delivers print data 80 for a different one of the colorizers 418. Each such pipe can thus be initiated independently and paced by its particular colorizer 418 in the print engine 412 in order to provide the print data at the appropriate time. However, this undesirably increases the cost of the printer 10, using a much larger ASIC 100, or using multiple ASICs 100.

Another design technique to provide print data in an overlapping but staggered manner is to use a single image pipe that generates multiple streams of print data concurrently. This image pipe could be a variation of the image pipe 50, such as one from which the color space mux 60 is omitted but which includes multiple print data generators 70 that operate in parallel. In this architecture, the pipe receives the compressed columnar region 42 of contone data and delivers print data 80 for all of the colorizers 418. However, this architecture still undesirably increases the cost of the printer 10 due to the larger ASIC 100 with multiple print data generators 70. Furthermore, since it delivers the print data 80 for all colorizers 418 essentially concurrently, a larger amount of print data memory 90 is used to store the print data for at least some of the colorizers 418 that has been produced, but not yet consumed, since the staggered colorizers 418 do not consume the print data at the same time. For example, a distance of 54 mm between developers typically requires about an additional 32 MB of memory to store the print data. Such an increase in the amount of memory also undesirably increases the cost of the printer 10.

In another design technique, the image pipe 50 (FIG. 4) implements a time-division multiplexed pipeline (TDMP). The pipe 50 operates to generate print data 80 for a single color plane at a faster speed than a colorizer 18 can consume the print data 80. For example, for the printer 10 with four colorizers 18, a given strip is processed by the pipe 50 four times (once for each colorizer), and the pipe 50 generates the print data of an entire strip 88 for one colorizer 18 at least four times faster than the colorizer 18 can consume it. In addition, where there are two columnar regions 42 per compressed strip 40, the pipe 50 generates the print data 80 for one columnar region 42 of one colorizer 18 at least eight times faster than the colorizer 18 can consume it, since in this case the pipe 50 uses two passes to generate the print data 80 for the entire strip 88.

The sequence in which strips of print data 80 for different ones of the colorizers 18 are generated by the pipe 50 can be staged in any order. This is typically determined to some extent by the sequential order and colorizer gap of the colorizers 18 in the print engine 20. The ordering of the sequence, and the timing of pipe operation, may be chosen such that the print data is generated "just-in-time" for each colorizer 18 to consume it. Doing so advantageously allows the size of the memory to be reduced and optimized relative to other design techniques. Furthermore, using a single ASIC 100 having a single print data generator 70, as illustrated in FIG. 4, advantageously reduces the size and complexity of the ASIC 100 relative to other architectures.

Considering now an example ordering or sequencing of strips of print data 80 through the image pipe 50, and with reference to FIGS. 11A-B, the effect of the gaps 414A-C between the various colorizers 418A-D on the print data 80 being printed can be appreciated. As a page flows through the inline print engine 412 in the media movement direction 413, it encounters the Y colorizer 418A, the M colorizer 418B, the C colorizer 418C, and the K colorizer 418D, in this order. Thus the Y colorizer 418A can print the first page 416A during a time period 432A; the M colorizer 418B can print the first page 416A during a time period 432B; the C colorizer 418C can print the first page 416A during a time period 432C; and the K colorizer 418D can print the first page 416A during a time period 432D. The second page 416B can be printed by the colorizers similarly at time periods 434A-D. The corrected top-of-page (i.e. the point on the time axis when a particular colorizer 418 can print on the topmost portion of the page) resulting from the colorizer gaps 414A-C is illustrated in FIG. 11A for the first page 416A.

The colorizers 414 of some inline print engines 412, such as laser print engines, "draw" raster lines across the width of the page with a laser. As such, print data is delivered to a particular colorizer 414 from the print data memory 90 in one continuous stream for each raster line. Once a page of media starts moving through the print engine 412, it continues doing so at a fixed velocity until the page is completely printed by all of the colorizers 418. Thus the print data should be generated by the image pipe 50 and be present in the print data memory 90 at the time each colorizer 414 is ready to consume it for printing. If sufficient print data 80 is not present in the print data memory 90 at the time each colorizer 414 is ready to consume it for printing, an "underrun" condition occurs and the page will be improperly printed.

For much of the timeline, multiple colorizers 414 are printing on a page 416 at the same time, albeit at different page locations. There typically is also a time gap between pages, the length of which may be fixed or variable. This time gap corresponds to the period between, for example, the time periods 432A, 434A during which the Y colorizer 418A performs printing.

In order to make print data available to the various colorizers 414 as needed, the controller 52 (FIGS. 1, 6) sequences the processing of strips 40 through the image pipe 50. The controller 52 selects the strip 40 to be processed, along with the colorizer 414 for which the print data 80 corresponding to the strip 40 will be generated. In some examples, the order or sequence of strip processing may be determined algorithmically in advance.

In other examples, the order or sequence of strip processing may be determined dynamically by the controller 52. The controller 52 may select the next strip 40, and the colorizer for that strip, based on an availability of the memory buffer 90 of the particular colorizer 18 for receiving print data 80. For example, the amount of print data 80 remaining in the memory buffer 90 and not yet consumed by the particular colorizer may be monitored, and when the remaining amount falls below a certain threshold, the controller 52 orchestrates processing of another strip 40 for that colorizer by the image pipe 50. The controller 52 may select the next strip 40 and colorizer based on the amount of time that a particular colorizer 18 has been waiting for more print data 80 to be generated; for example, whether a colorizer 18 has been waiting for more than a threshold amount of time. The controller 52 may select the next strip 40 and colorizer based on the relative amounts of time that various colorizers 18 have been waiting for more print data 80 to be generated; for example, by determining which colorizer has been waiting the longest. These and other factors may be considered, alone or in combination, by the controller 52 when selecting the next strip 40 and the next colorizer for processing by the image pipe 50. The controller 52 may evaluate the memory availability, wait time, and other conditions while the image pipe 50 is processing a strip 40, or at the time the "strip complete" signal is received from the pipe 50.

The controller 52 reprograms the image pipeline 50 to process the next strip 40 and the next colorizer by loading into the pipeline 50 previously-saved state data associated with the next colorizer from a state memory 58 before the next strip 40 is processed, and saving modified state data associated with the processed strip 40 in the state memory 58 after the print data 80 for the strip 40 is generated. This state data is the same as, or similar to, the state data previously described with reference to FIG. 7.

The number of strips 40 into which a page of image data 22 is divided for processing through the image pipe 50 may be the same for all colorizers 414, or may be different for different colorizers 414. The number of strips 40 per page may also change based on the dimensions of the print media sizes and/or the different image sizes that can be printed on a given size media.

The example sequence 440 of strips 40 processed by the image pipe 50 uses a shorthand notation that identifies the colorizer and the page. For example, strip "Y1" 442 is the first (top) strip 40 of the first page 416A, and print data 80 for the Y colorizer 418A (to be printed during the time period 432A) is generated by the image pipe 50 for that strip. Strip "Y1" 444 is the last (bottom) strip of the first page 416A, and print data 80 for the Y colorizer 418A (to be printed during the time period 432A) is generated by the image pipe 50 for that strip. Strip "Y2" 446 is the first (top) strip of the second page 416B, and print data 80 for the Y colorizer 418A (to be printed during the time period 434A) is generated by the image pipe 50 for that strip.

Similarly, strip "K1" 452 is the first (top) strip 40 of the first page 416A, and print data 80 for the K colorizer 418D (to be printed during the time period 432D) is generated by the image pipe 50 for that strip. Strip "K1" 454 is the last (bottom) strip of the first page 416A, and print data 80 for the K colorizer 418D (to be printed during the time period 432D) is generated by the image pipe 50 for that strip. Strip "K2" 456 is the first (top) strip of the second page 416B, and print data 80 for the K colorizer 418D (to be printed during the time period 434D) is generated by the image pipe 50 for that strip.

It can be appreciated that strip "Y1" 442 and strip "K1" 452 are the same strip 40, processed separately in order to generate print data for two different colorizers 418A,D. Similarly, strip "Y1" 444 and strip "K1" 454 are also the same strip 40, as are strip "Y2" 446 and strip "K2" 456.

It can further be appreciated that, since the spacing of the colorizers 418 in the inline print engine 412 is such that the Y colorizer 418A prints on a given portion of a page before the K colorizer 418D prints on the same portion of the page, print data 80 for the Y colorizer 418A is generated for a number of strips of the first page before any print data 80 for the K colorizer 418D is generated.

It can also be appreciated that the page overlap region 460 represents a time period during which two different pages are being printed by the inline print engine 412, with at least one colorizer 418 printing on the first page 416A while at least one other colorizer 418 is printing on the second page 416B.

As has been described, FIGS. 11A-B illustrate an example sequencing of strips of print data through an image pipe 50 that has a single print data generator 70, as illustrated in FIG. 4, and which generates print data for a single colorizer. In another example, an image pipe 50 may include N print data generators 70, which operate in parallel to generate print data for N corresponding colorizers. For example, consider an image pipe 50 with two parallel print data generators 70. In this case, each strip 40 that is processed by the image pipe 50 concurrently generates print data 80 for two colorizers 418. For example, print data for the Y colorizer 418A and the M colorizer 418B may be concurrently generated, and print data for the C colorizer 418C and the K colorizer 418D may be concurrently generated. The print data may be generated by the image pipe 50 just in time for consumption by the Y colorizer 418A and the C colorizer 418C. Since the colorizers are staggered in the print engine 412 by the colorizer gaps 414A-C, the print data memory 90 would be sized to store more print data for the M colorizer 418B and the K colorizer 418D, since the print data for these colorizers would be generated a significant amount of time in advance before it is consumed by these colorizers 418B,D. It can be appreciated that the increased size of the print data memory 90, however, is still significantly reduced from the size that would be used to accommodate print data 80 for all four colorizers 418A-D data being generated concurrently. In addition, the printing throughput of the system can advantageously be increased using an image pipe 50 that has two parallel print data generators 70 as compared to an image pipe 50 that has a single print data generator 70, due to reducing by half the number of times a strip 40 is processed through the image pipe 50 to generate all the print data for an image.

Another example of the present disclosure, as best understood with reference to FIG. 12, is a method 500 of printing, using plural inline colorizers of a printer, a page of contone data representing pixels of an image in a row-and-column format. In some scenarios, the flowchart of FIG. 12 may be considered as steps in a method implemented in the printer 10, such as for example by controller 52 executing instructions in instruction memory 54.

The method 500 begins, at 502, by selecting a multi-row strip of the contone data. At 504, the strip is processed through an image pipeline to generate print data corresponding to the strip for a particular subset of the colorizers. The subset may be a single colorizer, or may be any number of colorizers fewer than all of the colorizers. At 506, the print data is provided to the particular subset of the colorizers so that the colorizers can print the data. The print data may be provided to the particular colorizer subset by storing it in the appropriate position in a print data memory 90. If no more strips and no more colorizers remain to be processed ("No" branch of 508), then the method 500 concludes. If more strips, or more colorizers for the present strip, remain to be processed ("Yes"

branch of 508), then at 510 at least one of a different multi-row strip or a different subset of the colorizers is selected. The number of colorizers in a subset may be the same for all selections, or may vary from selection to selection. In some examples, this selecting includes, at 512, dynamically selecting at least one of a different multi-row strip or a different subset of the colorizers, in some cases based on a sensed condition of the printer. Possible sensed conditions include, at 514, at least one of (a) an availability of a memory buffer of a particular colorizer to receive print data, (b) an amount of print data for the particular colorizer remaining in the memory buffer, and (c) a amount of time that the particular colorizer has been waiting for print data. The selecting has the effect of ensuring that each colorizer, once it has started printing the page, has sufficient print data to print the entire page without having to stop for lack of print data (e.g. "underrun" or data starvation). Thus the method can be considered as implementing a "just-in-time" approach for supplying print data to the various colorizers in sufficient time to avoid data starvation but not so far in advance as to require an excessive amount of print data buffer memory. It can also be appreciated that, by processing the print data for a particular colorizer nearer to the time when it is going to be consumed by the colorizer, a significant reduction in the amount of storage space used to hold the print data in the print data memory 90 can be achieved. At 516, the image pipeline is reprogrammed in accordance with the at least one of a different multi-row strip or a different subset of the colorizers prior to the repeating. In some examples, the block 502 to select the strip, the blocks 510, 512, 514 to select the different strip and/or colorizer subset, and the block 516 to reprogram the pipeline may be implemented in or performed by the controller 52. The controller 52 may operate to dynamically specify the selected strip and the selected colorizer subset for each of a sequence of processing operations performed by the pipe 50 that collectively generate the print data 80 for all of the strips 40 and all of the colorizers 18, 418.

From the foregoing it will be appreciated that the printer and methods provided by the present disclosure represent a significant advance in the art. The size and complexity of the ASIC 100, and the size of the print data memory 90, are advantageously reduced. A single design can be scaled up and down the performance-vs.-cost curve, allowing a single base of hardware to support a wide range of printer products in a cost-effective manner.

Terms of orientation and relative position (such as "top," "bottom," "side", "left," "right," and the like) are not intended to require a particular orientation of any element or assembly, and are used for convenience of illustration and description. Although several specific examples have been described and illustrated, the disclosure is not limited to the specific methods, forms, or arrangements of parts so described and illustrated. For example, examples of the disclosure are not limited to one particular printing technology, but may include laser printers and inkjet printers, to name just a few. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified.

The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A printer having plural inline single-color colorizers, comprising:
    an image pipeline structured to process, with a single halftoner in a single halftoning operation, a multi-row strip of pixels of a page of image data to generate print data for a subset of the colorizers that is fewer than all the colorizers used to print the strip, each multi-row strip including all pixels of corresponding rows of the page and extending in a direction orthogonal to a media movement direction and each colorizer configurable to print all pixels of rows of the page; and
    a controller structured to time-division multiplex the halftoner among different subsets of the plural colorizers used to print the strip, among different subsets of colors used to print the strip, and among different multi-row strips of the page, according to dynamically sensed conditions of the printer, to generate print data for the entire page and all the colorizers used to print the page.

2. The printer of claim 1, wherein the subset of the colorizers is a single colorizer.

3. The printer of claim 1, wherein the controller is structured to use the dynamically sensed conditions to select a multi-row strip and a colorizer subset for a next processing operation by the image pipeline.

4. The printer of claim 3, comprising:
    a buffer memory to receive the generated print data from the pipeline and provide the received print data to the inline colorizers, wherein the controller is structured to select the multi-row strips and the colorizer subsets for subsequent processing operations by the image pipeline to avoid a memory underrun condition for any colorizer once that colorizer has begun printing the media page.

5. The printer of claim 3, wherein the controller is structured to dynamically reprogram the pipeline to process the selected multi-row strip for the selected colorizer subset by loading into the pipeline from a state memory previously-saved state data associated with the selected strip and the selected colorizer subset before the selected strip is processed, and saving modified state data in the state memory after the print data is generated.

6. The printer of claim 1, wherein the colorizers are configured to consume print data from a buffer memory concurrently with the image pipeline sending print data to the memory in a just-in-time operation.

7. The printer of claim 6, wherein a size of the memory is reduced to a size sufficient for the just-in-time operation.

8. The printer of claim 1, wherein the sensed conditions comprise an availability of a buffer memory to receive print data for a particular colorizer.

9. The printer of claim 1, wherein the sensed conditions comprise an amount of unconsumed print data for a particular colorizer that remains in a buffer memory.

10. The printer of claim 1, wherein the sensed conditions comprise an amount of time that a particular colorizer has been waiting for print data to be placed in a buffer memory.

11. The printer of claim 1, wherein the sensed conditions comprise a characteristic of a multi-row strip selected for a next processing operation by the image pipeline.

12. A method of printing, using plural inline colorizers of a printer, a page of contone data representing pixels of an image in a row-and-column format, the columns extending in a media movement direction, comprising:

processing, with a single halftoner in a single halftoning operation, a multi-row strip of the contone data smaller than the page to generate print data corresponding to the strip for a subset of the colorizers that is fewer than all the colorizers and all colors used to print the strip, each multi-row strip including all pixels of corresponding rows of the page and each colorizer configurable to print all pixels of rows of the page;

after the processing, printing the print data with the subset of the colorizers;

choosing a different subset and repeating the processing for the multi-row strip;

selecting a different strip and repeating the processing for the different strip; and dynamically sensing a condition of the printer and determining, based on the condition, whether to perform the choosing or the selecting after the processing.

13. The method of claim 12, wherein the subset of the colorizers is a single colorizer.

14. The method of claim 12, comprising:

prior to the repeating, reprogramming a time-division multiplexed image pipeline to process the selected multi-row strip to generate the print data for the selected colorizer subset.

15. The method of claim 12, wherein the repeating time-division multiplexes the image pipeline among the plural colorizers and the multi-row strips.

16. The method of claim 12, wherein the selecting and the processing generate print data such that, once a colorizer has begun printing the page, that colorizer has sufficient print data to finish printing the page without stopping.

17. The method of claim 12, wherein the processing is performed by an image pipeline of the printer, and wherein the sensed condition is one or more of an availability of a buffer memory of a particular colorizer to receive print data, an amount of print data remaining to be printed in the buffer memory of a particular colorizer, an amount of time that a particular colorizer has been waiting for print data to be placed in the buffer memory, and a characteristic of a multi-row strip selected for a next processing operation by the image pipeline.

18. A method of printing, using plural inline colorizers of a printer, a page of contone data representing pixels of an image in a row-and-column format, the columns extending in a media movement direction, comprising:

processing, with a single halftoner in a single halftoning operation, a multi-row strip of the contone data smaller than the page to generate print data corresponding to the strip for a subset of the colorizers that is fewer than all of the colorizers and all colors used to print the strip, each multi-row strip including all pixels of corresponding rows of the page and extending in a direction orthogonal to a media movement direction and each colorizer configurable to print all pixels of rows of the page;

beginning to print the page according to the print data with at least one colorizer of the subset before any print data is generated for at least one colorizer not in the subset;

choosing a different subset of the colorizers for the multi-row strip and repeating the processing; and selecting a different strip and repeating the processing, wherein the choosing and the selecting are interspersed such that, once printing has begun, each colorizer has sufficient print data to finish printing the page without stopping.

19. The method of claim 18, wherein the selecting comprises:

dynamically selecting the at least one of the different multi-row strip or the different colorizer subset based on a sensed condition of the printer.

20. The method of claim 18, wherein the sensed condition is one or more of an availability of a buffer memory of a particular colorizer to receive print data, an amount of print data remaining to be printed in the buffer memory of a particular colorizer, an amount of time that a particular colorizer has been waiting for print data to be placed in the buffer memory, and a characteristic of a multi-row strip selected for a next processing operation by the image pipeline.

21. The printer of claim 1, wherein the image pipeline has a single print data generator to generate print data for a single single-color colorizer, and wherein the controller time-division multiplexes the generator among the plural single-color colorizers used to print the strip.

22. The printer of claim 1, wherein the controller is structured to direct the image pipeline to generate print data for a subset of the colorizers for a subsequent multi-row strip before the image pipeline has generated print data for all the colorizers used to print a prior multi-row strip.

23. The printer of claim 1, wherein the subset equals N colorizers, and wherein the pipeline has N print data generators arranged in parallel to generate the print data for the N colorizers.

24. The printer of claim 1, wherein the plural inline colorizers comprise one colorizer for each of the colors printable by the printer.

* * * * *